United States Patent
Singh et al.

(10) Patent No.: US 12,554,557 B2
(45) Date of Patent: *Feb. 17, 2026

(54) PRECISION GEOMETRY CLIENT FOR THIN CLIENT APPLICATIONS

(71) Applicant: Hexagon Technology Center GmbH, Heerbrugg (CH)

(72) Inventors: Anupreet Singh, Madison, AL (US); Kenneth Doyle Houser, Hartselle, AL (US); Cavender George Holt, Florence, SC (US)

(73) Assignee: Hexagon Technology Center GmbH, Heerbrugg (CH)

( * ) Notice: Subject to any disclaimer, the term of this patent is extended or adjusted under 35 U.S.C. 154(b) by 87 days.

This patent is subject to a terminal disclaimer.

(21) Appl. No.: 18/197,929

(22) Filed: May 16, 2023

(65) Prior Publication Data

US 2024/0385904 A1    Nov. 21, 2024

(51) Int. Cl.
*G06F 9/54* (2006.01)

(52) U.S. Cl.
CPC .......... *G06F 9/54* (2013.01); *G06F 2209/541* (2013.01); *G06F 2209/545* (2013.01)

(58) Field of Classification Search
CPC . H04L 67/02; H04L 67/1087; H04L 67/1091; G06F 9/54; G06F 2209/541; G06F 2209/545; G06T 17/10; G06T 11/001; G06T 15/04
USPC ......................................................... 719/313
See application file for complete search history.

(56) References Cited

U.S. PATENT DOCUMENTS

| | | | |
|---|---|---|---|
| 5,842,004 A * | 11/1998 | Deering | G06T 9/001 345/419 |
| 9,245,064 B2 * | 1/2016 | Loberg | G06F 30/13 |
| 9,401,044 B1 * | 7/2016 | Kaufman | G06F 3/017 |
| 11,113,847 B2 * | 9/2021 | Connelly | G06T 19/20 |
| 2009/0189894 A1 * | 7/2009 | Petrov | G06F 9/452 345/419 |
| 2010/0042377 A1 * | 2/2010 | Seroussi | G06F 30/13 703/1 |

(Continued)

FOREIGN PATENT DOCUMENTS

CN    107506517 A    12/2017

OTHER PUBLICATIONS

Rosenthaler L, Heitger F, Kübler O, von der Heydt R. Detection of general edges and keypoints. InComputer Vision-ECCV'92: Second European Conference on Computer Vision Santa Margherita Ligure, Italy, May 19-22, 1992 Proceedings 2 1992 (pp. 78-86). Springer Berlin Heidelberg. (Year: 1992).*

(Continued)

*Primary Examiner* — James N Fiorillo
(74) *Attorney, Agent, or Firm* — Nutter McClennen & Fish LLP

(57) ABSTRACT

Systems and methods to efficiently get precision geometry for a graphic object on a thin client application such as running on a browser or hand-held device. Specifically, a Precision Geometry Client running on a client device sends requests to a corresponding Precision Geometry Service running on a server system to obtain precision geometry primitives that the client device, thereby offloading the processor-intensive precision geometry processing from the client to the server system.

21 Claims, 5 Drawing Sheets

(56) References Cited

U.S. PATENT DOCUMENTS

| | | | |
|---|---|---|---|
| 2010/0042676 A1* | 2/2010 | Seroussi | G06F 30/13 |
| | | | 703/1 |
| 2013/0120368 A1* | 5/2013 | Miller | G06T 19/00 |
| | | | 345/419 |
| 2013/0328895 A1* | 12/2013 | Sellers | G06T 1/20 |
| | | | 345/522 |
| 2016/0224219 A1* | 8/2016 | Hwang | G06F 3/0482 |
| 2018/0240272 A1* | 8/2018 | Doolittle | G06T 17/20 |
| 2018/0300131 A1* | 10/2018 | Tannenbaum | G06F 9/3004 |
| 2018/0322386 A1* | 11/2018 | Sridharan | G06N 3/09 |
| 2018/0349108 A1* | 12/2018 | Brebner | H04W 4/80 |
| 2019/0087998 A1* | 3/2019 | Schluessler | G06T 15/005 |
| 2019/0221024 A1* | 7/2019 | Howson | G06T 1/60 |
| 2019/0311531 A1* | 10/2019 | Stich | G06T 15/005 |
| 2020/0118301 A1* | 4/2020 | Connelly | G06T 19/20 |
| 2021/0294620 A1* | 9/2021 | Scarfutti | H04L 67/02 |
| 2021/0304509 A1* | 9/2021 | Berkebile | G06V 40/20 |
| 2021/0375044 A1* | 12/2021 | George | H04N 13/117 |
| 2022/0058437 A1* | 2/2022 | Soni | G06N 3/08 |
| 2023/0129649 A1* | 4/2023 | Kalwani | G06T 15/005 |
| | | | 345/419 |
| 2024/0169595 A1* | 5/2024 | Ramirez Solorzano | |
| | | | G06T 15/503 |
| 2024/0170139 A1* | 5/2024 | Tan-Ngo | G06T 7/62 |
| 2024/0312033 A1* | 9/2024 | Moser | G06T 17/20 |
| 2024/0388623 A1* | 11/2024 | Singh | G06F 9/54 |
| 2025/0068493 A1* | 2/2025 | Singh | G06F 9/547 |

OTHER PUBLICATIONS

International Search Report and Written Opinion of the International Searching Authority for PCT/US2024/029202 dated Jul. 30, 2024 (13 pages).

Office Action for U.S. Appl. No. 18/197,897 dated Nov. 7, 2024 (33 pages).

* cited by examiner

PRECISION GEOMETRY CLIENT FOR THIN CLIENT APPLICATIONS

CROSS-REFERENCE TO RELATED APPLICATION(S)

The subject matter of this patent application is related to the subject matter of U.S. patent application Ser. No. 18/197,897 entitled PRECISION GEOMETRY SERVICE FOR THIN CLIENT APPLICATIONS filed on even date herewith, which is hereby incorporated herein by reference in its entirety.

FIELD OF THE INVENTION

The invention generally relates to systems and methods to efficiently get precision geometry for a graphic object on a thin client application such as running on a browser or hand-held device.

BACKGROUND OF THE INVENTION

Modern client applications running in a browser or inside a native application on a mobile device can display the geometry by serving the render-ready optimized graphics through a service hosted on a server or by streaming tessellated geometry directly from the server. The tessellated geometry is an approximation using triangles (also called as facets) or lines. The number of triangles or lines depends on the stroking tolerance or how fine the geometry is tessellated. However, client applications also need the ability to get and display precision geometry, i.e., exact edge or face geometry associated to the graphic object and allow application users to identify a unique position on this geometry. Both render-ready or the tessellated geometry lack necessary information or precision to be able to be used or converted to precision geometry. Furthermore, client applications running on desktops have directly tried to get the precision geometry from the geometry persisted in the database. One disadvantage of such an approach is that this requires lot of logic and processing power on the client side. This may work on a high-performance desktop having resources available to do this, but the heavy need for resources makes it prohibitive for clients that are resource-starved (like the ones running inside a browser or on mobile devices).

SUMMARY OF VARIOUS EMBODIMENTS

In accordance with one embodiment, a precision geometry system, method, and computer program product implement a precision geometry service that performs processes comprising identifying a graphic object for which precision geometry is needed for rendering on a display of a client device; determining a moniker identifier for the graphic object; transmitting a client request for precision geometry to a precision geometry server via an application program interface, the client request including the moniker identifier; receiving, from the precision geometry server, via the application program interface, a message containing formatted precision geometry data for the graphic object; converting the precision geometry data into tessellated geometry data; and rendering the tessellated geometry data on the display of the client device.

In various alternative embodiments, the application program interface may be a REST application program interface. The client request may be an HTTP request. The message may be a JSON message. The precision geometry data may include a projection or other precision graphics operation. The client request may further include options needed for the precision geometry. The precision geometry client may be configured to run in a thin client application.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

It should be noted that the foregoing figures and the elements depicted therein are not necessarily drawn to consistent scale or to any scale. Unless the context otherwise suggests, like elements are indicated by like numerals. The drawings are primarily for illustrative purposes and are not intended to limit the scope of the inventive subject matter described herein.

DESCRIPTION OF ILLUSTRATIVE EMBODIMENTS

Definitions. As used in this description and the accompanying claims, the following terms shall have the meanings indicated, unless the context otherwise requires.

A "set" includes one or more members, even if the set description is presented in the plural (e.g., a set of Xs can include one or more X).

Certain embodiments are generally directed to systems and methods to efficiently get precision geometry for a graphic object on a thin client application such as running on a browser or hand-held device. Specifically, a Precision Geometry Client (PGC) running on a client device sends requests to a corresponding Precision Geometry Service (PGS) running on a server system to obtain precision geometry primitives for rendering by the client device, thereby offloading the processor-intensive precision geometry processing from the client to the server system.

Figure 1:
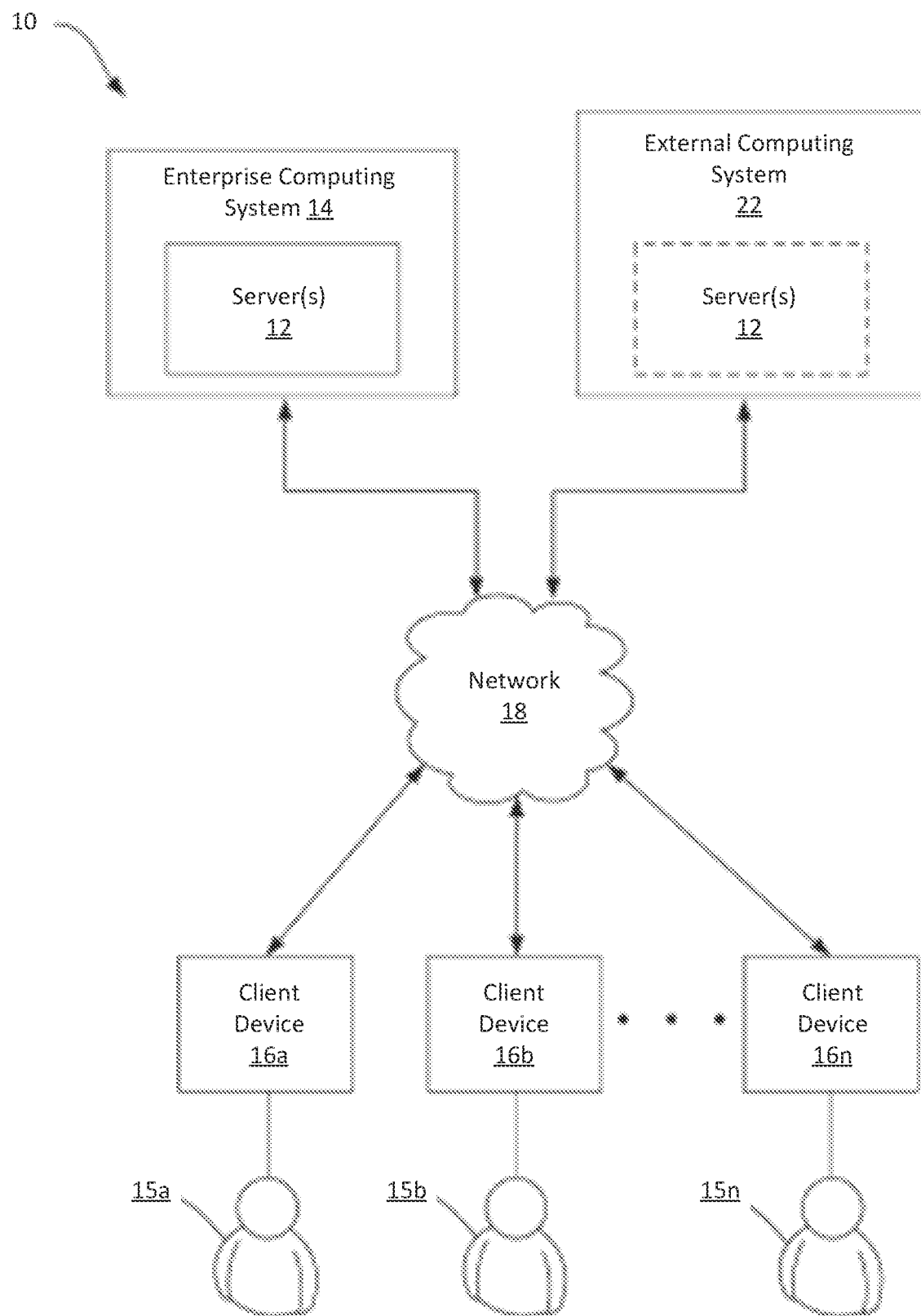
FIG. 1 is a schematic diagram illustrating one embodiment of an exemplary system consistent with the present disclosure.

FIG. 1 illustrates one embodiment of an exemplary system 10 consistent with the present disclosure. As shown, the system 10 includes one or more servers 12 that, for example, may run on an enterprise computing system 14 and/or an external computing system 22 (e.g., a cloud-based computing system). For convenience, the one or more servers 12 running on one or more computing systems 14, 22 can be referred to collectively as a server system 12. It should be noted that the term "server" is used herein broadly to mean any computing device or system that can perform the types of operations discussed herein and is not limited, for example, to a physical or virtual server computer.

The system 10 also includes one or more client computing devices 16(a)-16(n), which, for convenience, may be referred to herein individually as a client device 16 or collectively as client devices 16. Each client device 16(a)-16(n) is generally associated with a corresponding user 15(a)-15(n), who, for convenience, may be referred to herein individually as a user 15 or collectively as users 15, although it should be noted that certain client devices 16 may be unrelated to a specific user 15 (e.g., a client device 16 may operate autonomously or may be associated with a non-user entity such as a company, vehicle, etc.). In the present context, the users 15 may include administrators, customers, developers, or clients of a service provided by the server system 12. The users 15 may also include particular persons to which the service is directed.

The server system 12 is configured to communicate and share data with one or more user client devices 16 over a network 18, and, conversely, the client devices 16 are configured to communicate and share data with the server system 12 via the network 18, which can include data entered by users 15, data from any of various applications running on the client devices 16, and data generated by the client devices 16 themselves (e.g., location/GPS data). In addition, or alternatively, the client devices 16 may be configured to communicate with one another via the network 18 and/or other network (e.g., a particular client device may communicate with the server system 12 via the network 18 but communicate with another client device via a different network).

The network 18 may be or include any network that carries data. Non-limiting examples of suitable networks that may be used in whole or in part as network 18 include a private or non-private local area network (LAN), personal area network (PAN), storage area network (SAN), backbone network, global area network (GAN), wide area network (WAN), metropolitan area network (MAN), virtual private networks (VPN), or collection of any such communication networks such as an intranet, extranet or the Internet (i.e., a global system of interconnected networks upon which various applications or service run including, for example, the World Wide Web). The user mobile devices 16 generally communicate with the server system 12 over a wireless communication system that can include any suitable wireless communication technology. Non-limiting examples of suitable wireless communication technologies include various cellular-based data communication technologies (e.g., 2G, 3G, 4G, LTE, 5G, GSM, etc.), Wi-Fi wireless data communication, wireless LAN communication technology (e.g., 802.11), Bluetooth wireless data communication, Near Field Communication (NFC) wireless communication, other networks or protocols capable of carrying data, and combinations thereof. In some embodiments, network 18 is chosen from the internet, at least one wireless network, at least one cellular communication network, and combinations thereof. As such, the network 18 may include any number of additional devices, such as additional computers, routers, and switches, to facilitate communications. In some embodiments, the network 18 may be or include a single network, and in other embodiments the network 18 may be or include a collection of networks.

The server system 12 is configured to communicate and share data with the client devices 16 associated with one or more users 15. Accordingly, the client device 16 may be embodied as any type of device for communicating with the server system 12 and/or other client devices over the network 18. For example, at least one of the client devices may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a distributed computing system, a multiprocessor system, a processor-based system, and/or any other computing device configured to store and access data, and/or to execute software and related applications consistent with the present disclosure.

Figure 2:
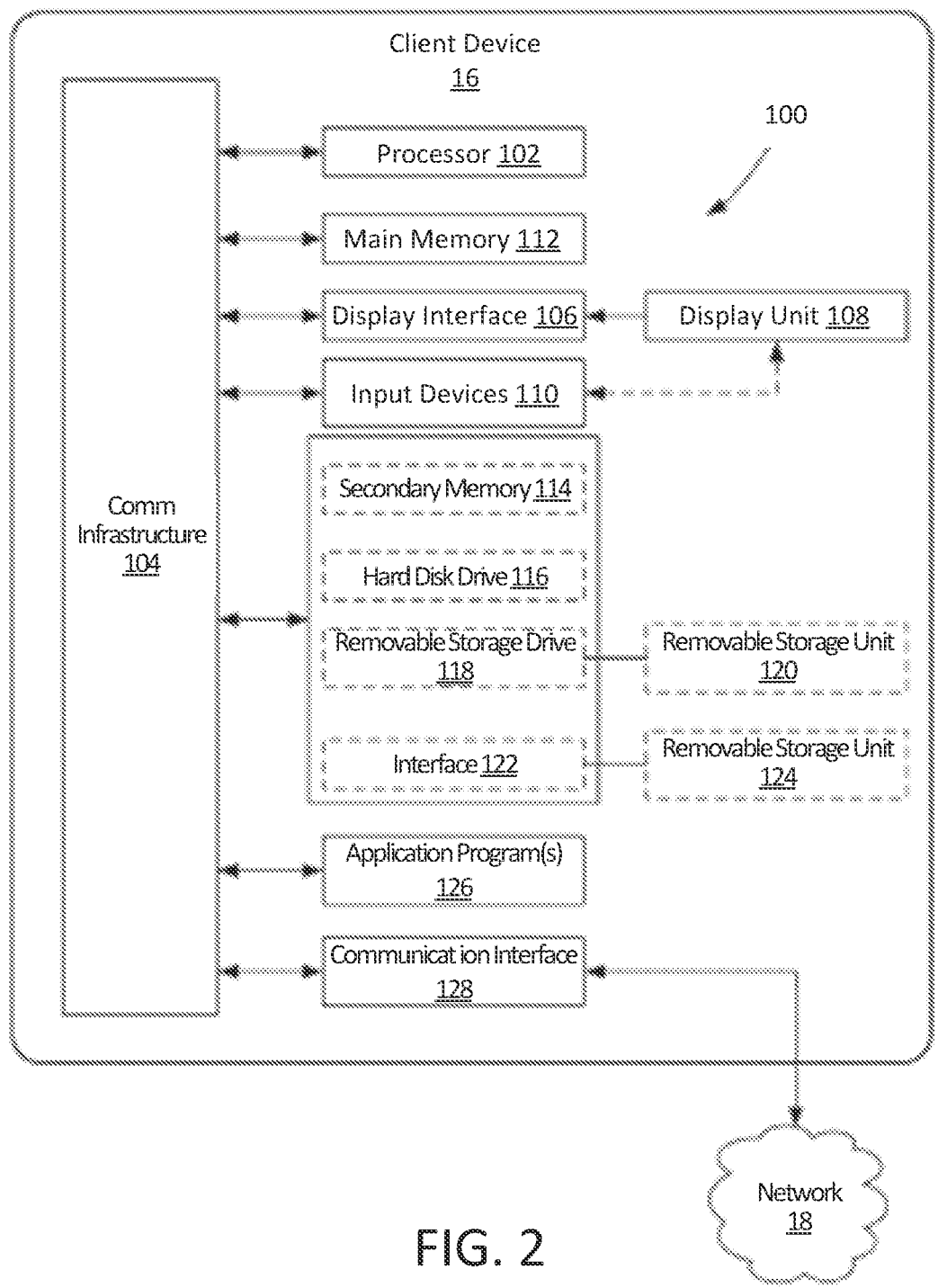
FIG. 2 is a schematic block diagram illustrating at least one embodiment of a client device configured as a mobile device consistent with the present disclosure.

FIG. 2 is a block diagram illustrating at least one embodiment of a client device 16 configured as a mobile device consistent with the present disclosure, although it should be noted that embodiments are not limited to mobile client devices. The mobile device 16 generally includes a computing system 100. As shown, the computing system 100 may include one or more processors 102, which can include, for example, at least one main processor (e.g., microprocessor, microcontroller, central processing unit, etc.) and optionally also at least one graphics processing unit (GPU) for performing any of various graphics-specific operations including, for example, producing tessellated graphics for display on display unit 108 (although in some embodiments the main processor may include a GPU and/or an extended instruction set of graphics instructions, or otherwise may perform graphics-specific operations such as in software). For convenience, the one or more processors are referred to herein collectively as "processor 102"). Processor 102 is operably connected to communication infrastructure 104 (e.g., a communications bus, cross-over bar, or network). The processor 102 may be embodied as any type of processor capable of performing the functions described herein. For example, the processor may be embodied as a single or multi-core processor(s), digital signal processor, microcontroller, or other processor or processing/controlling circuit.

The computing system 100 further includes a display interface 106 that forwards graphics, text, sounds, and other data from communication infrastructure 104 (or from a data buffer not shown) for display on display unit 108. The computing system further includes input devices 110. The input devices 110 may include one or more devices for interacting with the mobile device 16, such as a keypad, microphone, camera, as well as other input components, including motion sensors, and the like. In one embodiment, the display unit 108 may include a touch-sensitive display (also known as "touch screens" or "touchscreens"), in addition to, or as an alternative to, physical push-button keyboard or the like. The touch screen may generally display graphics and text, as well as provides a user interface (e.g., but not limited to graphical user interface (GUI)) through which a user may interact with the mobile device 16, such as accessing and interacting with applications executed on the device 16.

The computing system 100 further includes main memory 112, such as random access memory (RAM), and may also include secondary memory 114. The main memory 112 and secondary memory 114 may be embodied as any type of device or devices configured for short-term or long-term storage of data such as, for example, memory devices and circuits, memory cards, hard disk drives, solid-state drives, or other data storage devices. Similarly, the memory 112, 114 may be embodied as any type of volatile or non-volatile memory or data storage capable of performing the functions described herein.

In the illustrative embodiment, the mobile device 16 may maintain one or more application programs, databases, media, and/or other information in the main and/or secondary memory 112, 114. The secondary memory 114 may include, for example, a hard disk drive 116 and/or removable storage drive 118, representing a floppy disk drive, a magnetic tape drive, an optical disk drive, etc. Removable storage drive 118 reads from and/or writes to removable storage unit 120 in any known manner. The removable storage unit 120 may represents a floppy disk, magnetic tape, optical disk, etc. which is read by and written to by removable storage drive 118. As will be appreciated, removable storage unit 120 includes a computer usable storage medium having stored therein computer software and/or data.

In alternative embodiments, the secondary memory 114 may include other similar devices for allowing computer programs or other instructions to be loaded into the computing system 100. Such devices may include, for example, a removable storage unit 124 and interface 122. Examples of such may include a program cartridge and cartridge interface (such as that found in video game devices), a removable memory chip (such as an erasable programmable read only memory (EPROM), or programmable read only memory (PROM)) and associated socket, and other removable storage units 124 and interfaces 122, which allow software and data to be transferred from removable storage unit 124 to the computing system 100.

The computing system 100 further includes one or more application programs 126 directly stored thereon. The application program(s) 126 may include any number of different software application programs, each configured to execute a specific task.

The computing system 100 further includes a communications interface 128. The communications interface 128 may be embodied as any communication circuit, device, or collection thereof, capable of enabling communications between the mobile device 16 external devices (other mobile devices 16, the cloud-based service 14, and the external computing system/server 22). The communications interface 128 may be configured to use any one or more communication technology and associated protocols, as described above, to effectuate such communication. For example, the communications interface 128 may be configured to communicate and exchange data with the server 12, the external computing system/server 22 and/or one other mobile device 16 via a wireless transmission protocol including, but not limited to, Bluetooth communication, infrared communication, near field communication (NFC), radio-frequency identification (RFID) communication, cellular network communication, versions of IEEE 802.11 transmission protocol standards, and a combination thereof. Examples of communications interface 228 may include a modem, a network interface (such as an Ethernet card), a communications port, a Personal Computer Memory Card International Association (PCMCIA) slot and card, wireless communication circuitry, etc.

Computer programs (also referred to as computer control logic) may be stored in main memory 112 and/or secondary memory 114 or a local database on the mobile device 16. Computer programs may also be received via communications interface 128. Such computer programs, when executed, enable the computing system 100 to perform the features of the present invention, as discussed herein. In particular, the computer programs, including application programs 126, when executed, enable processor 102 to perform the features of the present invention. Accordingly, such computer programs represent controllers of computer system 100.

In one embodiment where the invention is implemented primarily in software, the software may be stored in a computer program product and loaded into the computing system 100 using removable storage drive 118, hard drive 116 or communications interface 128. The control logic (software), when executed by processor 102, causes processor 102 to perform the functions of the invention as described herein. In another embodiment, the invention may be implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention may be implemented using a combination of both hardware and software.

In order to provide precision geometry at the client device 16, certain embodiments will include new components running on the server system 12 and on the client device 16. For convenience, the new component running on the server system is referred to herein for convenience as the Precision Geometry Service (PGS), and the new component running on the client device 16 is referred to herein for convenience as the Precision Geometry Client (PGC).

Figure 3:
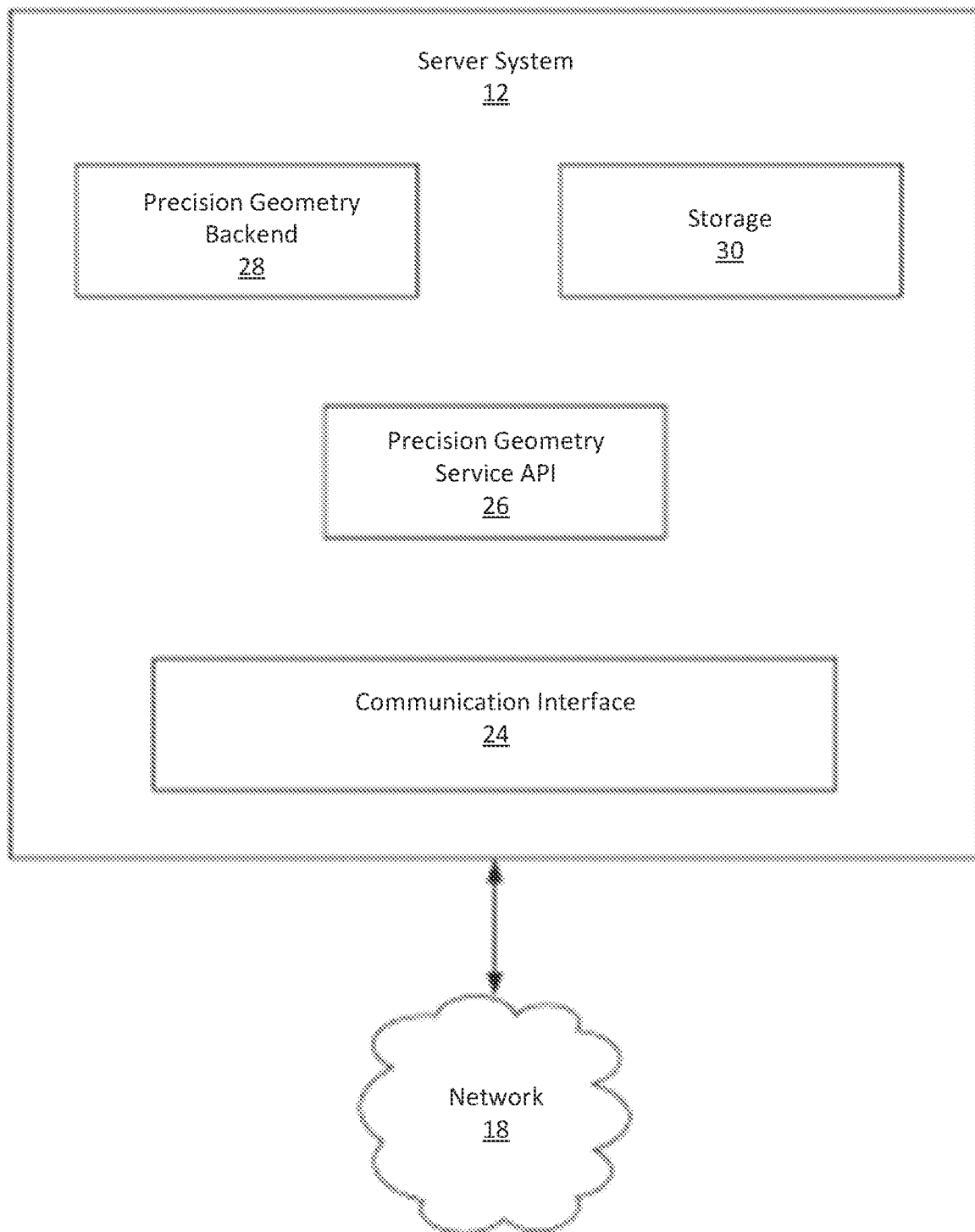
FIG. 3 is a schematic block diagram showing relevant components of a server system, in accordance with certain embodiments.

As shown schematically in FIG. 3, in certain exemplary embodiments, the PGS preferably will include two different micro-services that preferably (but not necessarily) are deployed separately, namely a Precision Geometry Service API 26 (which may be a Web API) and a Precision Geometry Backend 28. Among other things, this separation, though not essential, allows these services to scale horizontally separately based on load on the server, and hence optimize server resources. In certain exemplary embodiments, the Precision Geometry Service API 26 is implemented as a REST API based on OData standard, although other embodiments are possible. The Precision Geometry Service API 26 communicates with the Precision Geometry Backend 28 such as through gRPC messages. Thus, for example, the Precision Geometry Backend 28 may include a gRPC service that listens to the requests from the Precision Geometry Service API 26 and responds to such requests.

Figure 4:
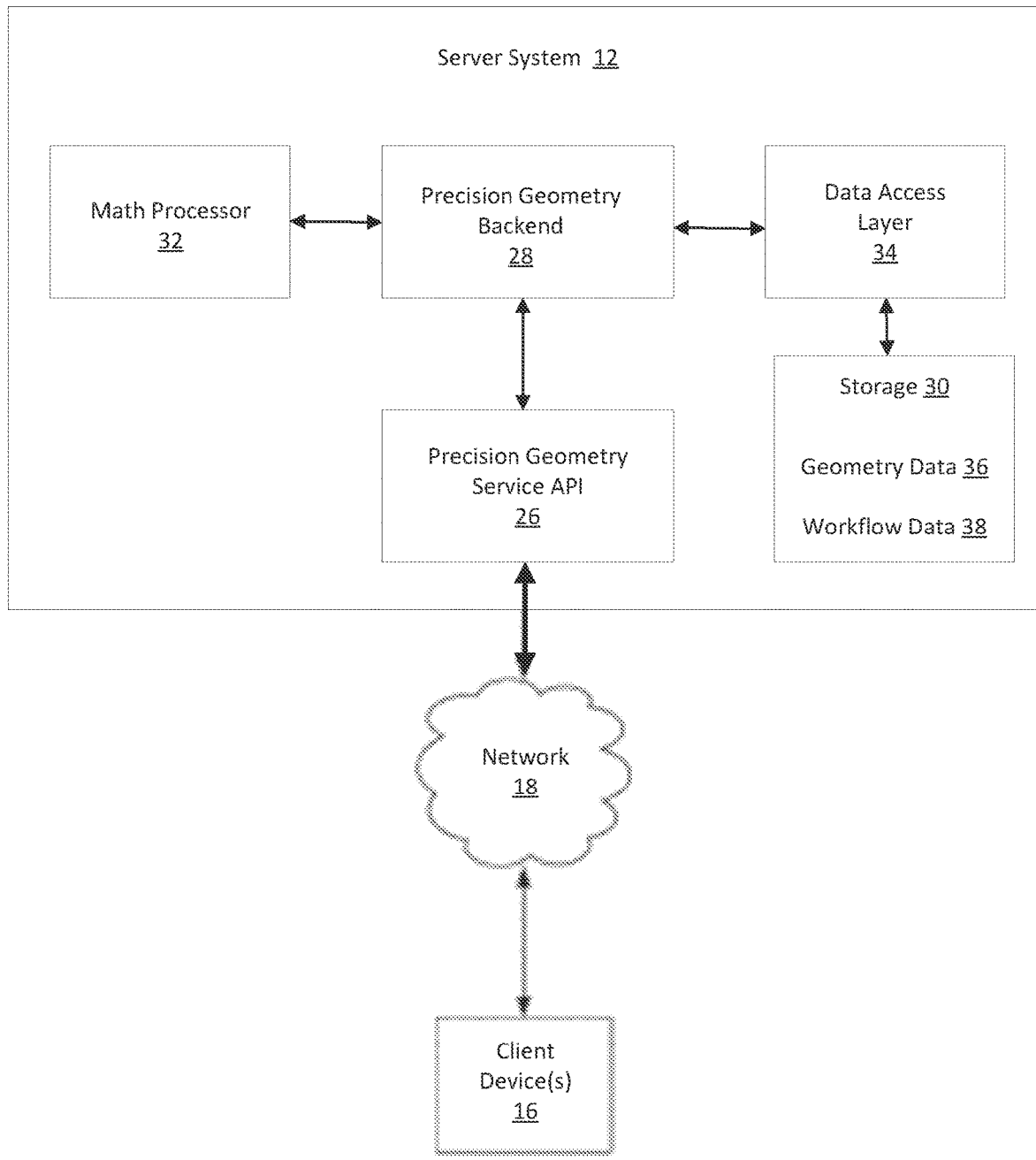
FIG. 4 is a schematic block diagram showing relevant components of a Precision Geometry Service in greater detail.

As shown schematically in FIG. 4, in certain exemplary embodiments, the PGS includes additional components such as a Math Processor 32 and a Data Access Layer 34. The Data Access Layer (DAL) 34 is configured to read persistent Geometry Data 36 from the persistent Storage 30. In certain exemplary embodiments, the client device 16 provides an identifier (e.g., a moniker ID or other identifier) for the requested Geometric Data 36, and the Data Access Layer 34 retrieves the Geometric Data 36 from the persistent Storage 30 based on the identifier. The raw Geometric Data 36 is provided to the Math Processor 32, which is configured to convert the raw Geometry Data 36 to precision geometry primitives. It should be noted that multiple instances of the Math Processor 32 may be executed within the server system 12, e.g., using multiple cloud containers. These precision geometric primitives are then converted into an optimal format for consumption/rendering by the client device 16 (e.g., a JSON format). Since the PGS is configured to handle multiple precision geometry requests simultaneously, the Precision Geometry Backend 28 may maintain Workflow Data 38, e.g., to correlate a client request with raw and precision geometry data such as to support an asynchronous API.

Figure 5:
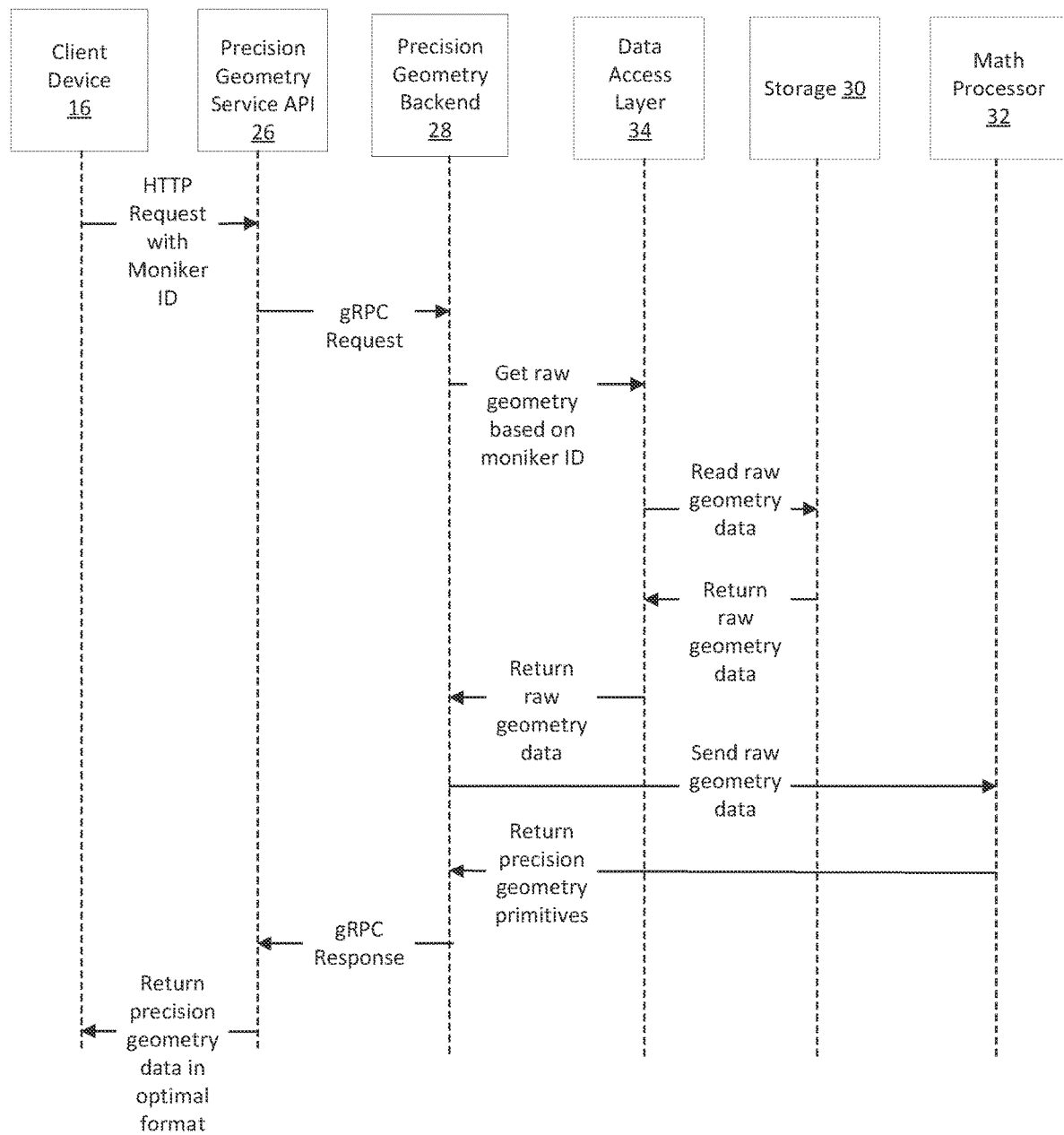
FIG. 5 is a schematic message flow diagram for precision geometry support, in accordance with certain embodiments.

More specifically, as shown schematically in FIG. 5, in certain exemplary embodiments, the client device 16 sends an HTTP request containing a moniker ID to the Precision Geometry Service API 26. The Precision Geometry Service API 26 sends a corresponding gRPC request to the Precision Geometry Backend 28. The Precision Geometry Backend 28 makes a request to the Data Access Layer 34 to get the raw geometry data based on the moniker ID from the client device 16. The Data Access Layer 34 interfaces with the persistent Storage 30 to read the raw Geometry Data 36 and return the raw Geometry Data 36 to the Precision Geometry Backend 28. The Precision Geometry Backend 28 then sends the raw geometry data to the Math Processor 32, which generates the precision geometry primitives and returns them to the Precision Geometry Backend 28. The Precision Geometry Backend 28 packages the precision geometry primitives and sends them via the Precision Geometry Service API 26 to the client device 16, which then can render or otherwise process the precision geometry primitives (e.g., converting the precision geometry into a tessellated geometry for rendering on the screen).

Thus, among other things, the PGC generally will be configured to perform the following operations:

1. Get the moniker of the graphic object whose precision geometry is being requested.
2. Prepare an HTTP request with the moniker and options needed for the precision geometry.
3. Convert the precision geometry obtained in the response to tessellated geometry and render it on the screen.
4. Get the unique position on the precise geometry of the object for given user input.

Among other things, the PGS generally will be configured to perform the following operations:

1. Receive a request (e.g., an HTTP request) from the client via a Precision Geometry Service API.
2. Read raw geometry of a given graphic object from persistent storage.
3. Generate precision geometry primitives from the raw geometry.
4. Convert the precision geometry to an optimal format that can be consumed by the client efficiently.
5. Prepare the response with the precision geometry data and transmit the response to the client device 16 via the Precision Geometry Service API.

Thus, the services deployed on the server prepare the precision geometry, thus allowing the client component to get the geometry without having to require significant resources on the client device. These services can further be scaled independently of the client, thus allowing it to be used on thin client applications to provide a high-performance service on thin client devices like Browsers and Mobile applications.

It should be noted that the PGC and PGS may be configured to handle more complex precision geometry operations, such as, for example and without limitation, forming 2D projections or slices of 3D geometries, forming 3D geometries from 2D data, rotating/translating/flipping geometric data, texture mapping, adding augmented reality elements to geometry displays, producing a B-spline surface, manipulating geometric shapes such as cones, spheres, torus, etc.

The following are sample REST APIs exposed on the PGS and called by the PGC in accordance with various embodiments.

1. /Geometry/FetchEdgeExtent: Provides the ability to determine a parameter that describes the distance a 3D point falls along an edge, given the id of an object, the name of an edge contained on the object, and a 3D point.

```
Request Text
{
edgeMonikers:  [
        string
        ]
renderIds: [
        integer($int64)
    ]
x: [
        number($double)
    ]
y: [
        number($double)
    ]
z: [
        number($double)
    ]
}
Response Text
{
edgeMoniker:   string
extent: string
}
```

2. /Geometry/FetchEdgePointFrom Extent: Provides the ability to determine a 3D point that lies on an edge at a given distance, given the render id of an object, the name of an edge contained on the object, and an extent parameter describing the distance along the edge.

```
Request Text
edgeMonikers:  [
    string
    ]
extent: [
    number($double)
    ]
renderIds: [
    integer($int64)
    ]
}
Response Text
{
moniker:   string
renderId:  integer($int64)
stream: string
}
```

3. /Geometry/MonikerLookup: Provides the ability to return a combination of the edges, faces, or keypoints of an object based on flags, given the moniker of an object and a set of flags.

```
Request Text
monikers:  [
    string
    ]
flags: [
    integer($int64)
    ]
Response Text
{
moniker:   string
renderId:  integer($int64)
stream: string
}
```

4. /Geometry/RenderIdLookup: Provides the ability to get a combination of the edges, faces, or keypoints of an object based on flags, given the render id of an object and a set of flags.

```
Request Text
{
renderIds: [
   integer($int64)
]
flags: [
   integer($int64)
]
}
Response Text
moniker:   string
renderId:  integer($int64)
stream: string
}
```

The flags parameter specifies which of a set of precision geometry operations are performed and returned to the PGC. In certain embodiments, the flags are individual bits that can be set and checked using bitwise operators, although the set of precision geometry operations could be specified in other ways, e.g., specified using strings, descriptors, objects, etc. In certain embodiments, the set of precision geometry operations flags are defined as follows (where "0×" represents hexadecimal values):

0×01—If set returns edge gtypes
0×02—if set returns face gtypes
0×04—if set returns full gtype
0×08—if set returns edge keypoints
0×10—if set returns face keypoints
0×20—if set return all created keypoints Unused bits are reserved such as to add further precision geometry operations or other functions in the future.

Thus, for example, in certain embodiments, the six flag bits may be encoded as follows:

| ... Bit 6 | Bit 5 | Bit 4 | Bit 3 | Bit 2 | Bit 1 | Bit 0 |
|---|---|---|---|---|---|---|
| Reserved | All Keypoints | Face Keypoints | Edge Keypoints | Full gtype | Face gtypes | Edge gtypes |

In order to perform geometric processes, the PGS may access a library of mathematical functions (Math Kernel) such as via various C++ APIs. The following are some of the geometric processes that can be performed by the PGS using the Math Kernel functions in various embodiments:

1. Create a semi-infinite (bore line ray) line by two points using the eye as point one and the screen point as the other, e.g., to project the point onto an object face or edge
2. Intersect geometry face or edge and bore line
3. Find the minimum distance between multiple geometries faces
4. Find the minimum distance between a bore line and a curve (b-Spline curves, arc, ellipse, lines)
5. Find the minimum distance between multiple curves
6. Find intersection between bore line and a curve
7. Find the precision point along a curve using curve parameters
8. Find the precision point on the geometry face using geometries parameters Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In alternative embodiments, the disclosed apparatus and methods (e.g., as in any flow charts or logic flows described above) may be implemented as a computer program product for use with a computer system. Such implementation may include a series of computer instructions fixed on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as a tangible, non-transitory semiconductor, magnetic, optical or other memory device, and may be transmitted using any communications technology, such as optical, infrared, RF/microwave, or other transmission technologies over any appropriate medium, e.g., wired (e.g., wire, coaxial cable, fiber optic cable, etc.) or wireless (e.g., through air or space).

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads. Software systems may be implemented using various architectures such as a monolithic architecture or a microservices architecture.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the EAM system 28, Coverage Map Module 32, Workflow Module 34, smartphone apps, etc.) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer routing systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A precision geometry system comprising:
at least one processor coupled to at least one memory containing instructions which, when executed by the at least one processor, causes the system to implement a precision geometry client, wherein the precision geometry client is configured to perform processes comprising:
identifying a graphic object for which precision geometry is needed for rendering on a display of a client device;
determining a moniker identifier for the graphic object;
determining a set of precision geometry operations to be performed for the graphic object;
transmitting a client request for precision geometry to a precision geometry server via an application program interface, the client request including the moniker identifier and at least one flags parameter indicating which of a set of precision geometry operations to be performed for at least one edge, face, and/or keypoint of the graphic object;
receiving, from the precision geometry server, via the application program interface, a message containing formatted precision geometry data for the graphic object;
converting the precision geometry data into tessellated geometry data; and
rendering the tessellated geometry data on the display of the client device.

2. The system of claim 1, wherein the application program interface is a REST application program interface.

3. The system of claim 1, wherein the client request is an HTTP request.

4. The system of claim 1, wherein the message is a JSON message.

5. The system of claim 1, wherein the precision geometry data includes a projection.

6. The system of claim 1, wherein the set of precision geometry operations includes at least one of return edge gtypes, return face gtypes, return full gtype, return edge keypoints, return face keypoints, or return all created keypoints.

7. The system of claim 1, wherein the precision geometry client is configured to run in a thin client application.

8. A precision geometry method comprising:
identifying a graphic object for which precision geometry is needed for rendering on a display of a client device;
determining a moniker identifier for the graphic object;
determining a set of precision geometry operations to be performed for the graphic object;
transmitting a client request for precision geometry to a precision geometry server via an application program interface, the client request including the moniker identifier and at least one flags parameter indicating which of a set of precision geometry operations to be performed for at least one edge, face, and/or keypoint of the graphic object;
receiving, from the precision geometry server, via the application program interface, a message containing formatted precision geometry data for the graphic object;
converting the precision geometry data into tessellated geometry data; and
rendering the tessellated geometry data on the display of the client device.

9. E method of claim 8, wherein the application program interface is a REST application program interface.

10. The method of claim 8, wherein the client request is an HTTP request.

11. The method of claim 8, wherein the message is a JSON message.

12. The method of claim 8, wherein the precision geometry data includes a projection.

13. The method of claim 8, wherein the set of precision geometry operations includes at least one of return edge gtypes, return face gtypes, return full gtype, return edge keypoints, return face keypoints, or return all created keypoints.

14. The method of claim 8, wherein the precision geometry client is configured to run in a thin client application.

15. A computer program product comprising at least one tangible, non-transitory computer-readable storage medium having embodied therein computer program instructions which, when executed by one or more processors of a system, cause the system to implement a precision geometry client, wherein the precision geometry client is configured to perform processes comprising:
identifying a graphic object for which precision geometry is needed for rendering on a display of a client device;
determining a moniker identifier for the graphic object;
determining a set of precision geometry operations to be performed for the graphic object;
transmitting a client request for precision geometry to a precision geometry server via an application program interface, the client request including the moniker identifier and at least one flags parameter indicating which of a set of precision geometry operations to be performed for at least one edge, face, and/or keypoint of the graphic object;
receiving, from the precision geometry server, via the application program interface, a message containing formatted precision geometry data for the graphic object;
converting the precision geometry data into tessellated geometry data; and
rendering the tessellated geometry data on the display of the client device.

16. The computer program product of claim 15, wherein the application program interface is a REST application program interface.

17. The computer program product of claim 15, wherein the client request is an HTTP request.

18. The computer program product of claim 15, wherein the message is a JSON message.

19. The computer program product of claim 15, wherein the precision geometry data includes a projection.

20. The computer program product of claim 15, wherein the set of precision geometry operations includes at least one of return edge gtypes, return face gtypes, return full gtype, return edge keypoints, return face keypoints, or return all created keypoints.

21. The computer program product of claim 15, wherein the precision geometry client is configured to run in a thin client application.

* * * * *